United States Patent [19]
Peters et al.

[11] Patent Number: 4,909,694
[45] Date of Patent: Mar. 20, 1990

[54] ROUND BALE TRAILER

[76] Inventors: Francis A. Peters; Edward G. Peters, both of 2933 Pleasant Valley Rd., West Bend, Wis. 53095

[21] Appl. No.: 239,388

[22] Filed: Sep. 1, 1988

[51] Int. Cl.4 ................................................. B60P 1/48
[52] U.S. Cl. ..................... 414/24.5; 414/470; 414/483; 414/501; 414/552; 414/111; 298/10; 298/18
[58] Field of Search ...................... 414/24.5, 24.6, 111, 414/470, 477, 483, 501, 546, 551, 552, 911; 298/13, 18, 10

[56] References Cited

U.S. PATENT DOCUMENTS

| | | | |
|---|---|---|---|
| 2,919,953 | 1/1960 | Gruhlkey | 298/18 X |
| 3,922,036 | 11/1975 | Kalsbeck et al. | 414/470 X |
| 3,924,765 | 12/1975 | Hostetler | 414/528 X |
| 4,117,940 | 10/1978 | Adam | 414/24.5 |
| 4,259,034 | 3/1981 | Ward et al. | 414/24.6 |
| 4,261,676 | 4/1981 | Balling, Sr. | 414/24.5 |
| 4,718,806 | 1/1988 | Chambers | 414/24.5 |

Primary Examiner—Robert J. Spar
Assistant Examiner—James T. Eller, Jr.
Attorney, Agent, or Firm—Donald Cayen

[57] ABSTRACT

A round bale trailer includes a trailer that travels in a hay field in the same direction that the field is normally worked to approach round hay bales in a direction perpendicular to the bales' axes. A U-shaped fork on the round bale trailer engages three sides of the bale. A closing arm on the fork closes to engage the bale on the fourth side. Continued motion of the trailer causes the fork and bale to rotate together 90 degrees about a vertical axis such that the fork closes to nest within a generally U-shaped frame. A hydraulic cylinder immediately operates to pivot the frame and fork to a vertical attitude, such that the bale rolls off the fork and onto the trailer. Pivoting the frame to the horizontal attitude automatically opens the fork by the use of a spring. All the bales are unloaded at one time by an unloading mechanism that tilts the trailer such that the bales roll off one side thereof.

38 Claims, 6 Drawing Sheets

ROUND BALE TRAILER

BACKGROUND OF THE INVENTION

1. Field of the Invention.

This invention pertains to agricultural equipment, and more particularly to implements for handling baled hay.

2. Description of the Prior Art.

It has become increasingly popular in recent years to bale hay into cylindrical stacks or bales. Although cylindrical or round bales offer many advantages over traditional rectangular bales, the round bales are very heavy and difficult to handle.

Various types of equipment have been developed to transport round hay bales from the fields to a barn or other storage location. Examples of such implements may be seen in U.S. Pat. Nos. 3,924,765; 4,249,842; 4,261,676; 4,498,829; 4,549,840; 4,630,986; and 4,718,806. In general, the devices of the foregoing patents comprise elongated wheeled trailers for holding and transporting the bales, means for loading the bales from the ground onto the trailer, and means for moving the loaded bales longitudinally along the trailer.

A major disadvantage of prior round bale handling equipment is that they must approach the bales in a direction perpendicular to the direction in which the field is normally worked. As is well known, agricultural personnel prefer to work their fields in a single direction. In that way, any ruts formed in soft soil run in only that direction. Driving a tractor and other heavy equipment across the fields perpendicular to the direction of the ruts produces a very bumpy and uncomfortable ride and also tends to damage the machinery.

In addition, the machinery of the aforementioned patents do not have satisfactory means for unloading the bales from the respective trailers. Several of the prior art bale handlers have conveyors for moving the bales along the trailer. The conveyors can also be used to unload the bales, but only in conjunction with a forward motion of the trailer. Since it is highly desirable to minimize bale storage space, the operator must simultaneously advance the tractor and operate the conveyor in properly timed relationship to unload the bales in a tight row. Such a procedure requires skill and is time consuming. The bale carrier of U.S. Pat. No. 4,261,676 includes a bale supporting bed that tips to roll the bales transversely off the trailer. However, the bale supporting bed adds undesirable weight and complexity to that carrier.

Thus, a need exists for improved round bale handling machinery.

SUMMARY OF THE INVENTION

In accordance with the present invention, a round bale trailer is provided that loads, transports, and unloads cylindrical hay bales in a rapid and economical manner. This is accomplished by apparatus that includes a trailer section with a bale loading mechanism that pivots a round bale 90 degrees on the ground prior to lifting the bale onto the trailer section.

The trailer section is made with a pair of elongated longitudinally extending structural beams transversely spaced with cross braces. Single or tandem axles and tires are mounted to the back end of the structural beams for rolling the trailer section along the ground. The front ends of the beams terminate in a rotary hitch for attaching the trailer to a conventional farm tractor. The trailer section includes a loading station for receiving round bales of hay.

Bales are loaded onto the trailer section at the loading station by means of the bale loading mechanism, which is mounted near the front end and on the outside of one of the trailer section beams. Pivotally mounted to the trailer section beam for pivoting about a first longitudinal axis is a generally U-shaped frame. The U-shaped frame has a hollow center leg that lies adjacent the trailer section beam, with the ends of the frame center leg being received in hinge bearings. The frame has first and second side legs that extend perpendicularly to the frame center leg and the trailer section beams. To pivot the frame about the first axis, a hydraulic loading cylinder is mounted to the underside of the trailer section beams for actuation in a transverse direction thereto. The loading cylinder operates to pivot the frame between a first attitude wherein the frame is in a generally horizontal attitude approximately 16 inches above the ground and a second attitude wherein the frame is generally vertical.

Mounted to the U-shaped frame for rotating about a second axis is a generally U-shaped fork. The U-shaped fork comprises a center bar, and first and second side bars. In order to handle different diameter bales, the length of the fork first side bar is adjustable. Preferably, a wide smooth plate is attached to the inside of fork second side bar. The second axis is located at a point of rotational attachment at the end of the frame second leg and on the fork second end bar near its junction with the fork center bar. When the frame is in the horizontal attitude, the second axis has a vertical orientation. The fork is rotatable about the second axis between a closed position wherein it is generally coincident and nested within the U-shaped frame, and an open position wherein the openings of the fork and frame are approximately 90 degrees to each other. When in the closed configuration, the fork first side bar is directly over and is supported by the first leg of the frame. A stop on the fork second end bar abuts the second leg of the frame to limit the open position of the fork relative to the frame. When the fork is closed and the frame is in the horizontal attitude, operating the loading cylinder to pivot the frame to the vertical attitude causes the fork to pivot with the frame to the vertical attitude.

With the frame in the horizontal attitude and the fork in the open position without a bale of hay in the fork, pivoting the frame to the vertical attitude automatically causes the fork to swing to the closed position nested within the frame. This is achieved by a short chain that is tied at one end to the fork near the second axis and at the second end to a trailer section beam. As the frame is pivoted upwardly by the loading cylinder, the chain tightens to pull the fork and cause it to start to rotate about the second axis toward the closed position. As the second axis approaches the horizontal orientation, gravity acting on the fork causes it to continue to rotate to the closed position, such that the fork is always closed within the frame when the frame is in the vertical attitude and no hay bale is present in the fork.

With the frame and fork coincident in the vertical attitude, lowering the frame by means of the loading cylinder automatically opens the fork. Fork opening is accomplished by the combination of a strong spring nested inside the frame hollow center leg and a cable connected between the spring and the fork second side bar. The spring and cable act on the fork to bias it to the open position. With the fork and frame together in the vertical attitude, lowering the frame causes the second axis to approach the vertical orientation and reduces the gravitational force holding the fork in the closed position nested within the frame. As the frame approaches the horizontal attitude, the spring force overcomes the gravitational force and rotates the fork to the open position. To cushion the stop on the fork as it abuts the frame second leg, we prefer that a shock absorber be employed between the fork second side bar and the frame second leg.

Pivotally mounted to the end of the fork first side bar is a closing arm. Closing arm pivotal motion is accomplished by a closing arm hydraulic cylinder. The closing arm is pivotable between an open location wherein it is parallel to the fork first side bar and a closed location wherein it is generally perpendicular to the fork first side bar and extends toward the free end of the fork second side bar.

In use, a person operates a tractor to pull the round bale trailer in a hay field in the same direction as the field is normally worked. Consequently, the tractor approaches the bales in a direction perpendicular to the axes of the bales. Through a suitable hydraulic circuit, the operator activates the loading cylinder to pivot the frame to the horizontal attitude, thereby simultaneously causing the fork to open. The closing arm cylinder is activated to pivot the closing arm to the open location. The tractor pulls the round bale trailer to engage the bale on three sides with the fork. The closing arm cylinder is operated to close and engage the round bale on a fourth side. Because of the weight of the bale, continued motion of the tractor and round bale trailer causes the bale to pivot the fork 90 degrees to the closed position about the second axis between the frame and the fork. The fork, primarily by means of the plate attached to the second side bar, simultaneously forces the bale to rotate 90 degrees on the ground. Upon closing of the fork, a trip immediately actuates the hydraulic circuit to operate the loading cylinder to pivot the frame and fork to the vertical attitude. Doing so lifts the bail and then causes it to roll a short distance onto the trailer section at the loading station. To prevent the bale from rolling off the opposite side of the trailer section, a short fence-like stop is fixed to the trailer section at the loading station opposite the loading mechanism. With the bale loaded, the operator actuates the hydraulic system to lower the frame toward the horizontal attitude, which automatically opens the fork by means of the spring and cable. The closing arm cylinder is actuated to open the closing arm, and the loading mechanism is ready to load another bale.

To remove the loaded bale from the loading station and make room for another bale, the present invention includes a bale pusher mechanism. The pusher mechanism comprises a pusher cylinder connected to a long slide that is guided for horizontal motion between and longitudinally along the trailer section beams. An upright joined to the slide pushes the bale along the beams away from the loading station and toward the back end of the trailer section when the pusher cylinder is actuated.

Further in accordance with the present invention, the cylinder bales are rapidly and easily unloaded from the trailer section by an unloading mechanism that tilts the entire trailer. The unloading mechanism comprises a hydraulic dump cylinder that acts on a lever pivotally connected at one end thereof to the trailer section beams. The lever is pivotable about a longitudinal axis between a raised position wherein the lever lies under and adjacent the trailer beams, and a lowered position wherein the lever free end contacts the ground. By operating the dump cylinder to continue to lower the lever after it has contacted the ground, the entire trailer tilts about the tires and rotary hitch to roll all the bales off the trailer section at one time.

Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
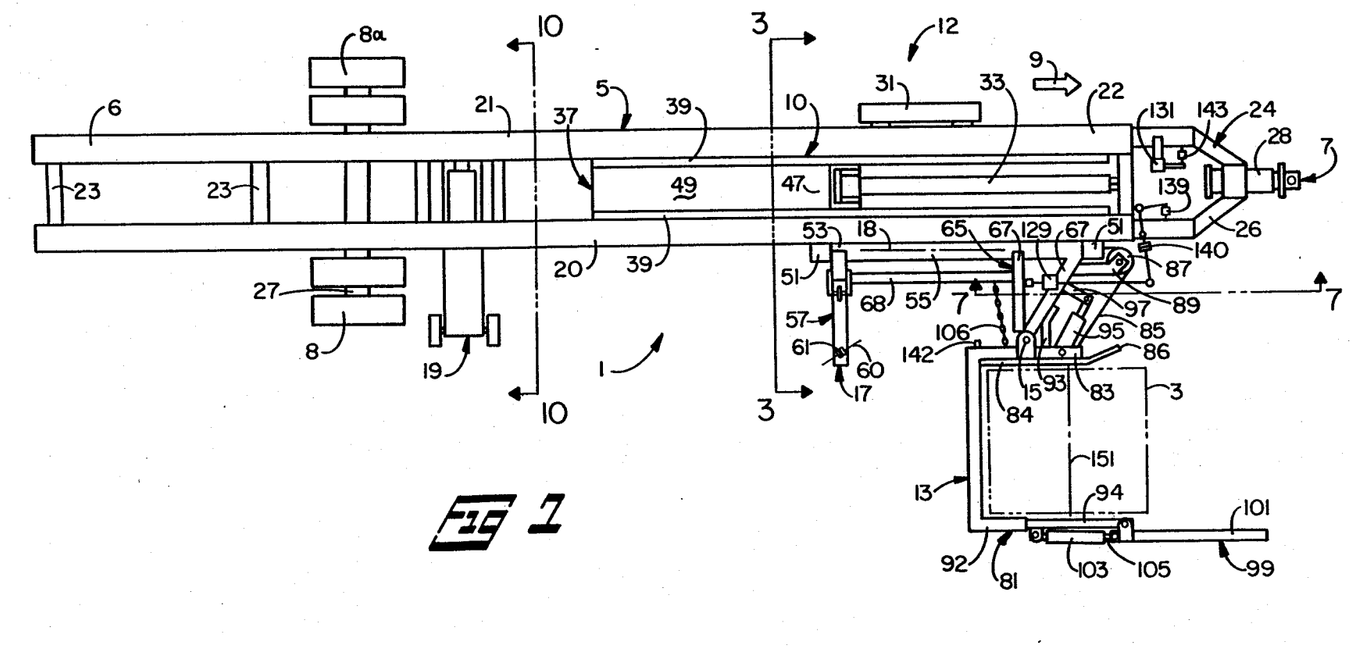
FIG. 1 is a top view of the round bale trailer of the present invention shown in a position for approaching a bale of hay in a field and with the pusher mechanism in an extended location.
Figure 2:
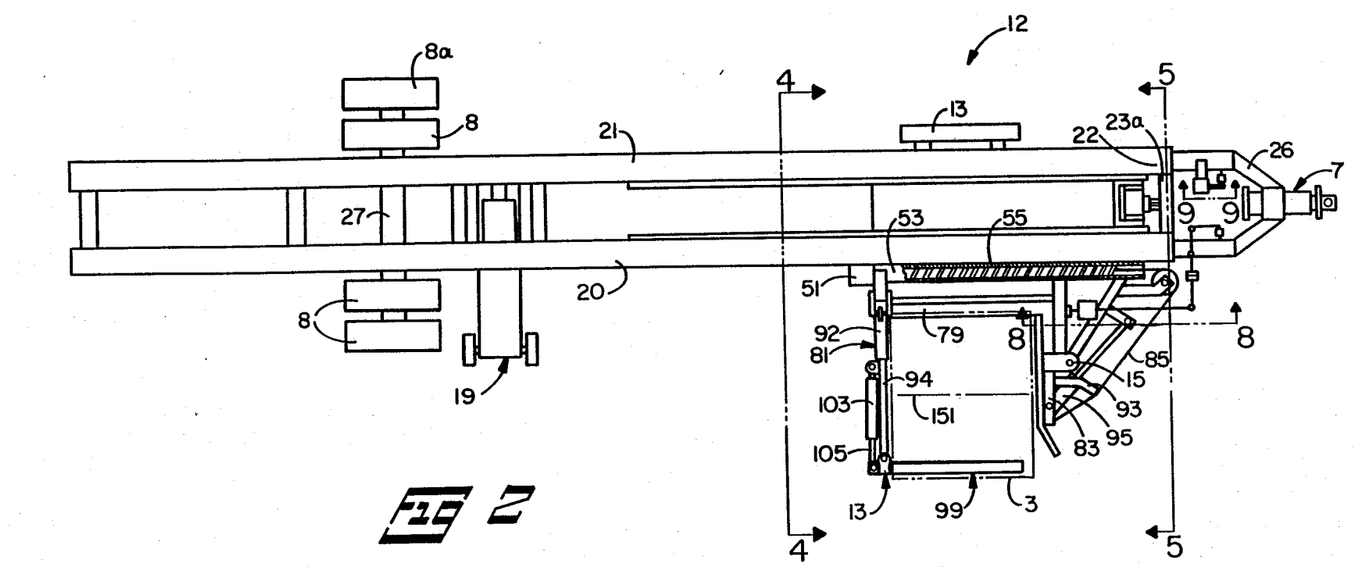
FIG. 2 is a view similar to FIG. 1, but partially broken, and showing the hay bale in a position to be loaded onto the trailer section and with the pusher mechanism in a retracted location.

Referring to FIGS. 1 and 2, a round bale trailer 1 is illustrated that includes the present invention. The round bale trailer is particularly useful for loading, transporting, and unloading cylindrical bales of hay 3, but it will be understood that the invention is not limited to agricultural applications.

General

The round bale trailer 1 is designed with an elongated trailer section 5 that includes a back end 6 supported by tires 8 and a front end 22 having a rotary hitch 7. The rotary hitch 7 is connectable to a conventional farm tractor, not shown, which pulls the round bale trailer in the direction of arrow 9. The trailer section 5 includes a loading station 12 for receiving the round hay bales 3, and a pusher mechanism 10 that reciprocates longitudinally along the trailer section at the loading station 12.

Figure 4:
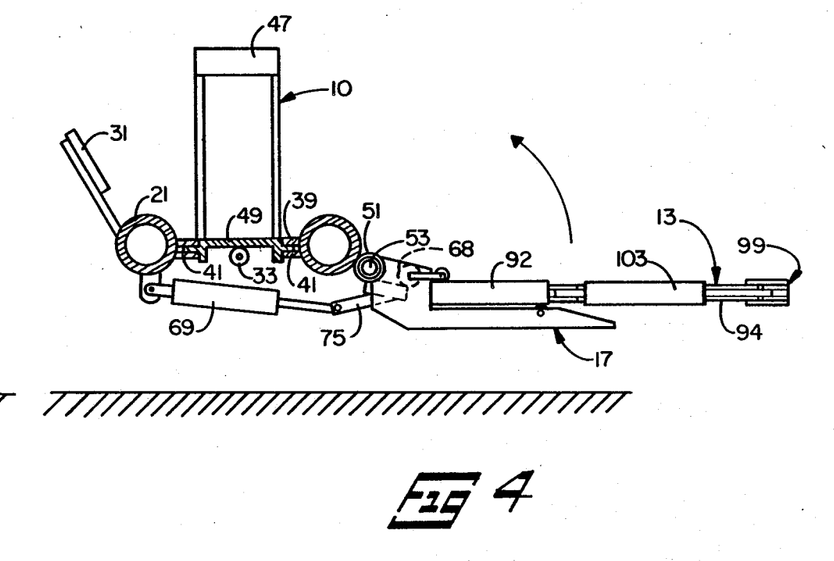
FIG. 4 is an enlarged cross sectional view taken along lines 4—4 of FIG. 2.
Figure 6:
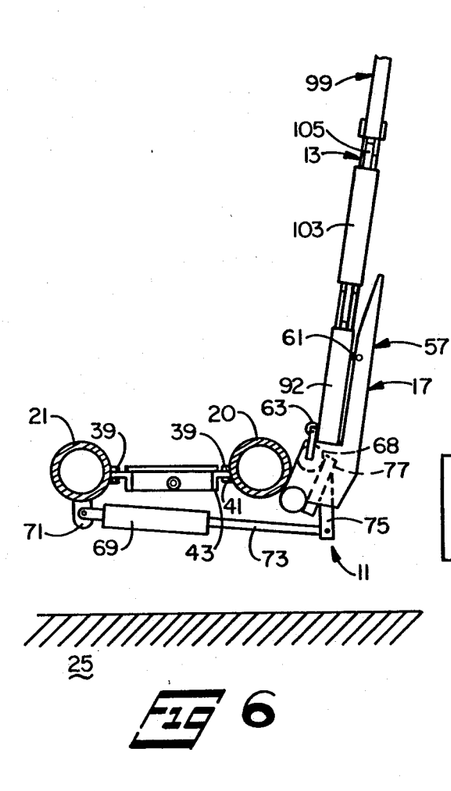
FIG. 6 is a cross sectional view similar to FIG. 4, but showing the round bale trailer in a configuration wherein the hay bale is raised off the ground for loading the bale onto the trailer section.

A loading mechanism 11 is employed to lift the hay bales 3 from the ground 25 onto the trailer section 5 at the loading station 12. The loading mechanism 11 comprises a generally U-shaped frame 17 that is pivotable about a horizontal axis 18 between a generally horizontal attitude, as shown in FIG. 4, and a generally vertical attitude, as shown in FIG. 6. A generally U-shaped fork 13 is rotatably connected to the frame 17 for rotation about an axis 15 between an open position, FIG. 1, and a closed position, FIG. 2. Axis 15 swings between a vertical orientation as shown in FIG. 1 and an approximately horizontal orientation when the frame is in the vertical attitude of FIG. 6.

Figure 10:
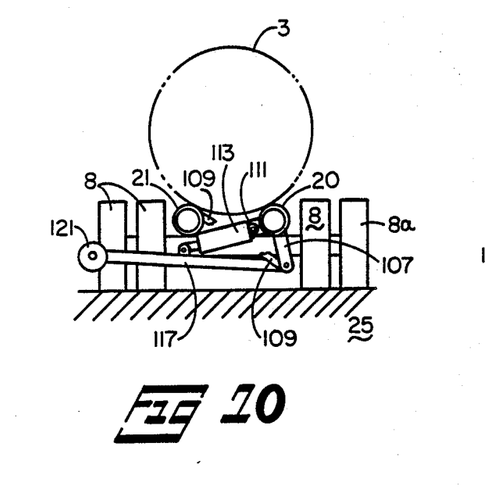
FIG. 10 is a cross sectional view taken along lines 10—10 of FIG. 1.
Figure 10A:
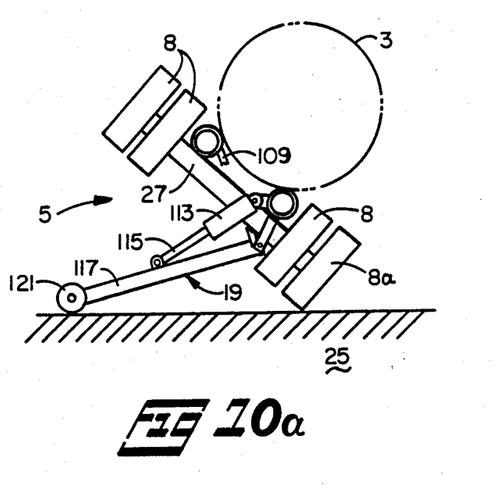
FIG. 10a is a view similar to FIG. 10, but showing the round bale trailer in a configuration for unloading the bales.

An unloading mechanism 19 enables the round bale trailer 1 to be tilted between a normal position as shown in FIG. 10 and a tipped position as shown in FIG. 10a. Tilting the round bale trailer causes all the hay bales 3 loaded on the trailer section to roll simultaneously off the trailer section and onto the ground.

Trailer Section

The trailer section 5 is comprised of two parallel elongated structural beams 20 and 21 joined at longitudinal intervals by cross braces 23. We have found that constructing the beams 20 and 21 from round steel tubes approximately 12 inches in diameter and spaced apart approximately 20 inches works very well. The back end 6 of the trailer section is supported off the ground 25 by tired wheels 8 rotatably mounted to an axle 27. The axle 27 may be attached to the beams 20 and 21 in any suitable manner.

Figure 7:
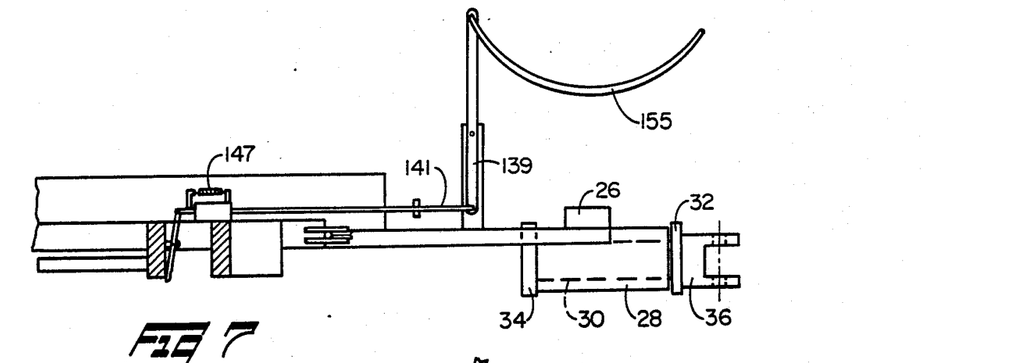
FIG. 7 is a cross sectional view taken along lines 7—7 of FIG. 1.
Figure 8:
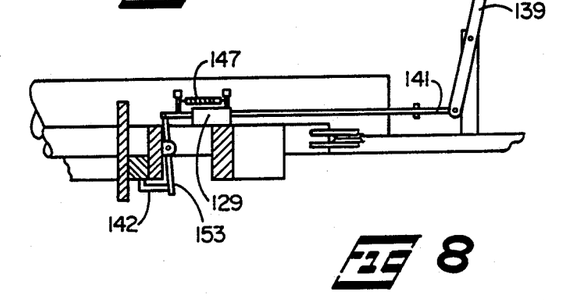
FIG. 8 is a cross sectional view taken along lines 8—8 of FIG. 2.
Figure 9:
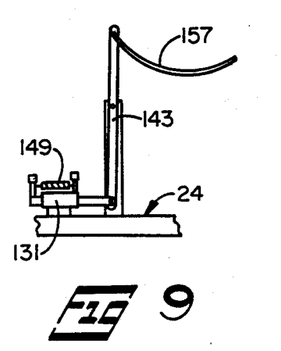
FIG. 9 is a view taken along lines 9—9 of FIG. 2.
Figure 9A:
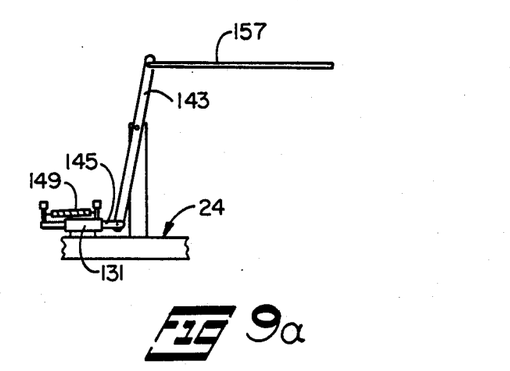
FIG. 9a is a view similar to FIG. 9, but showing the lever for operating the unloading mechanism in the operative configuration.

The trailer section front end 22 includes the rotary hitch 7 joined to a framework 24. The framework 24 may extend beyond the front end of the structural beams 20 and 21 and terminate in a heavy cross member 26. Welded to the cross member 26 is a tube 28. Looking also at FIG. 7, a shaft 30 is axially retained in the tube 28 by collars 32 and 34 welded to the opposite ends of the shaft. A clevis 36 is welded to the collar 32. The clevis 36 is dimensioned to mate with the draw bar of a conventional tractor, not illustrated. The trailer section front end 22 may also include a jack for adjustably supporting the trailer section front end off the ground. For clarity, the jack is not shown, as such jacks are well known, and it forms no part of the present invention. As best shown in FIGS. 1, 2, 4, and 5, a bale stop 31 is fixed to the structural beam 21 at the loading station 12.

Pusher Mechanism

The round bale trailer 1 includes a pusher mechanism 10 that is located at the trailer section loading station 12. The pusher mechanism comprises a slide 37 that is guided for reciprocation along the beams 20 and 21 by a pair of a vertically spaced narrow strips 39 and 41 welded to the respective beams. The slide 37 preferably comprises a pair of spaced longitudinally extending angle irons 43 joined at their respective back ends by a cross member 45. An upright 47 is welded to and joins the respective front ends of the angle irons 43. A tray 49 is joined to and spans the area between the two angle irons 43 and from the cross member 45 to the upright 47.

A hydraulic pusher cylinder 33 is fixed at one end thereof to a cross brace 23a between the structural beams 20 and 21. The cylinder piston rod 35 may be connected to the slide cross member 45. Actuating the hydraulic pusher cylinder 33 causes the slide 37 to reciprocate between the extended location shown in FIG. 1 and the retracted position shown in FIG. 2.

Loading Mechanism

Located at the front end 22 of the trailer section 5 is the loading mechanism 11 for loading hay bales 3 onto the trailer section loading station 12. In the preferred embodiment, the loading mechanism comprises a generally U-shaped frame 17 that is pivotally connected to the trailer section structural beam 20, and a generally U-shaped fork 13 that is rotatably connected to the frame 17. To pivotally support the frame on the trailer section, a pair of hinge bearings 51 are welded to the beam 20. The hinge bearings 51 define the horizontal axis 18. Pivotally received in the hinge bearings are the ends 53 of a hollow center leg 55 of the frame 17. Also see FIGS. 3 and 4. Fixed perpendicularly to one end of the frame center leg 55 is a first side leg 57. The first side leg 57 has a support portion 58 that terminates in a surface 59. Mounted for rotation in the support portion 58 is a roller 61. Preferably, the roller is skewed so that its axis 60 converges toward the axis 18 in the general direction of the trailer section front end 22. A second roller 63 is mounted to the first leg 57 over the support portion 58 and adjacent the surface 59. Also see FIG. 3.

Fixed perpendicularly to the second end of the frame center leg 55 is a second side leg 65. To provide adequate strength and rigidity to the second side leg 65, it preferably is constructed as two plates 67 joined into a generally V-she. A stiffening strut 68 extends between and is welded to the frame first and second side legs generally parallel to the center leg 55.

The frame 17 is pivotable between a generally horizontal attitude as shown in FIG. 4, and a generally vertical attitude, as shown in FIG. 6. When in the horizontal attitude, the plane of the frame is preferably approximately 16 inches above the ground 25. To achieve frame pivoting, the loading mechanism 11 comprises a loading cylinder 69. One end of the loading cylinder 69 is mounted to a lug 71, which in turn is welded to the support beam 20. The loading cylinder piston rod 73 is pivotally connected to a lever 75 that extends rigidly from a stiffening plate 77 welded to the frame center leg 55 and the strut 68.

Figure 5:
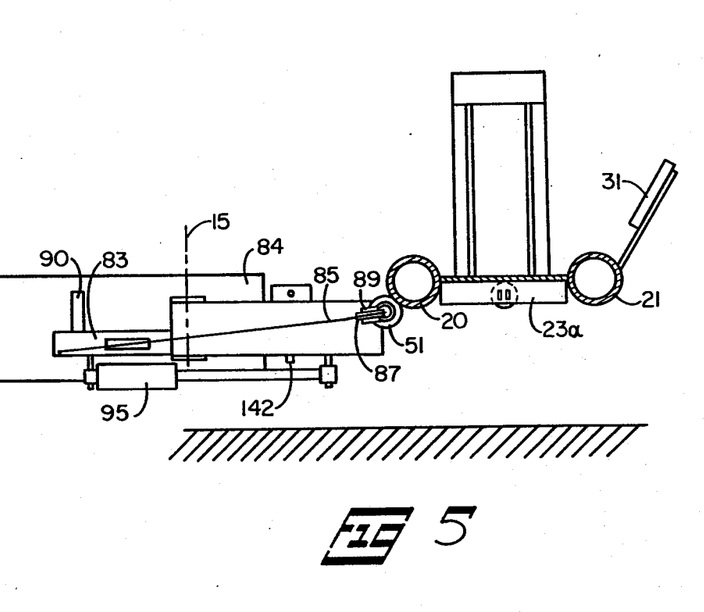
FIG. 5 is an enlarged cross sectional view taken along lines 5—5 of FIG. 2.

Mounted to the frame 17 for rotation about the axis 15 is the generally U-shaped fork 13. The fork comprises a center bar 79, a first side bar 81, and a second side bar 83. The fork second side bar 83 includes a relatively wide and smooth plate 84 that is bent at the free end 86 thereof so as to diverge from the free end of the first side bar 81. As best seen in FIG. 5, the plate 84 is attached to the second side bar 83 by various ribs typically represented by reference numeral 90.

To enable the round bale trailer 1 to handle bales 3 of different diameters, the fork first side bar 81 is formed with a tube portion 92. Slideably received within the tube portion 92 is a bar 94. The bar 94 is fixable to the tube portion by conventional locking means, not shown. The fork tube portion 92, slideable bar 94, second side bar 83, and wide plate 84 are dimensioned so as to be able to handle bales ranging from approximately four to six feet in diameter. If desired, the length of the fork center bar 79 can also be adjustable so that bales of different lengths can be handled by the loading mechanism 11. For example, the center bar 79 can be adjustable to suit bales four to five feet long. In that manner, the present invention is usable with a wide variety of hay baling implements.

The axis 15 is located at the free end of the second side leg 67 of the frame 17 and on the fork second side bar 83. In FIG. 1, the fork 13 is shown in an open position, wherein the fork first and second side bars 81 and 83, respectively, are parallel to the trailer section beams 20 and 21 and parallel to the direction of travel 9 of the round bale trailer 1. The fork is biased to the open position by means of a cable 85 fixed at one end near the free end of the fork second bar 83. The cable 85 is trained around a pulley 87 that is mounted for rotation on a bracket 89 fastened to the frame second leg 65. With particular attention to FIGS. 2 and 5, the cable enters the hollow center leg 55 of the frame 17. Inside the frame center leg is a strong spring 91 connected at one end thereof to the leg 55. The cable is fastened to the second end of the spring 91. The cable 85 and spring 91 maintain the fork 13 in the open position of FIG. 1 when the frame 17 is in the horizontal attitude of FIG. 3.

To locate the fork 13 in the open position against the force of the spring 91, a stop arm 93 is attached to the fork second side bar 83. The stop arm 93 is designed to abut the frame second leg 65 when the fork is in the open position. To cushion the impact of the stop arm on the frame second leg when the fork is opened under the influence of the spring 91, as will be explained in detail hereinafter, a shock absorber 95 is employed. One end of the shock absorber 95 is connected to the fork second side bar 83, and the shock absorber second end is connected to a post 97 fastened to and extending from the frame second leg 65.

When the fork 13 is in the closed position of FIG. 2, it is nested within the frame 17, with one end of the fork center bar 79 against the surface 59 of the frame first leg. See FIG. 6. In that situation, the frame roller 63 overlies the fork at the junction of the center and first bars thereof to snugly retain the fork in the frame. The frame roller 61 assists the fork to freely swing into the closed position on top of the frame first leg support portion 58.

The loading mechanism 11 further comprises a closing mechanism 99 that is mounted to the fork 13. The closing mechanism 99 comprises a closing arm 101 that is pivotally mounted to the slideable bar 94 of the fork first side bar 81. The closing arm 101 is pivotable between the open location of FIG. 1, wherein it is parallel to the fork first side bar 81, and a closed location, as shown in FIG. 2, wherein it is perpendicular to the fork first side bar. Opening and closing the closing arm 101 is accomplished by a closing arm cylinder 103. One end of the closing arm cylinder 103 is attached to the fork first side bar 81, and the cylinder piston rod 105 is connected to the closing arm.

It is a feature of the present invention that the fork 13 automatically rotates to the closed position within the frame 17 when the frame is pivoted to the upright attitude of FIG. 6 and no hay bale 3 is engaged by the fork. Looking at FIG. 1, a short chain 106 is connected between the fork and the trailer section 5. The chain 106 is connected to the fork between the axis 15 and the fork center bar 79. With the frame in the horizontal attitude of FIG. 3, at which attitude the fork 13 is in the open position because of the spring 91 and cable 85, the chain is slightly slack. As the loading cylinder 69 is operated to pivot the frame to the vertical attitude of FIG. 6, the chain tightens as the point of attachment thereof to the fork moves away from the point of chain attachment to the trailer section. Continued pivoting of the frame causes the chain to start to pull the fork against the force of the spring 91 toward the closed position within the frame. Eventually, as the frame approaches the vertical attitude, the weight of the partially closed fork, which is simultaneously pivoting about the axis 18 and rotating about the axis 15, is sufficient to overcome the force of the spring 91. Gravity then continues to cause the fork to rotate about the angularly oriented axis 15 to the closed position within the frame by the time the frame has reached the vertical attitude. In that configuration, the chain 106 again is slack.

Figure 3:
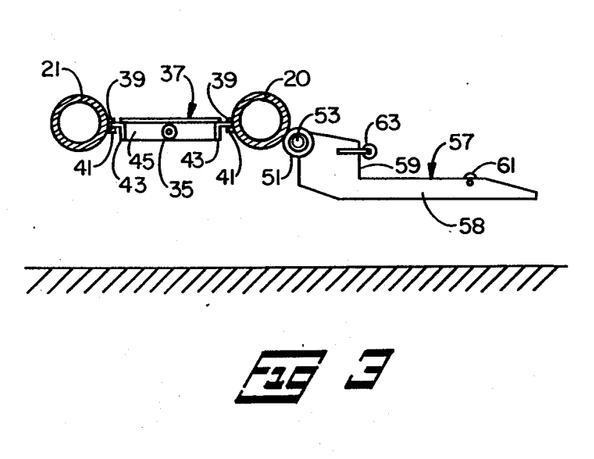
FIG. 3 is an enlarged cross sectional view taken along lines 3—3 of FIG. 1.

An important aspect of the present invention is that pivoting the frame 17 from the vertical attitude of FIG. 6 to the horizontal attitude of FIG. 4 simultaneously and automatically rotates the fork 13 to the open position of FIGS. 1 and 3. Automatic fork opening is achieved by means of the spring 91 and the cable 85. As the frame and fork are pivoted together by the loading cylinder 69 toward the horizontal attitude, the axis 15 swings toward a vertical orientation. Consequently, the force of gravity tending to hold the fork nested within the frame gradually lessens. As the frame approaches the horizontal attitude, the spring 91 eventually overcomes the force of gravity acting on the fork and rotates it to the open position. The shock absorber 95 cushions the stop arm 93 as it abuts the frame leg 65 at the fork open position.

Unloading Mechanism

Further in accordance with the present invention, the unloading mechanism 19 enables the entire round bale trailer 1 to be tilted from a normal position at which the beams 20 and 21 are generally horizontal to a tipped position at which the beams make an angle of approximately 35 degrees to 40 degrees from the horizontal. Looking at FIGS. 10 and 10a, the unloading mechanism comprises a pair of lugs 107 welded or otherwise fixed to the underside of the beam 20 and spaced longitudinally therealong. Connecting the free ends of the lugs 107 with the beams 21 are a pair of trusses 109. Joined to the beam 20 between the lugs 107 is another lug 111 to which is connected one end of a dump cylinder 113. The piston rod 115 of the cylinder 113 is connected to a strong lever 117 at a point on the lever intermediate its ends. One end of the lever 117 is pivotally connected to the lugs 107. If desired, wheels 121 can be mounted to the lever free end 119. In FIG. 10, the dump cylinder 113 is retracted, so that the lever 117 is in the raised position and the round bale trailer is in a normal position. In FIG. 10a, the cylinder 113 has operated to extend the piston rod 115 to swing the lever end 119 to contact the ground 25 with the wheels 121. Continued operation of the dump cylinder tilts the entire round bale trailer about the outer wheel 8a. Operating the dump cylinder to retract the piston rod 115 causes the round bale trailer to tilt back to the normal position of FIG. 10.

Control System

Figure 11:
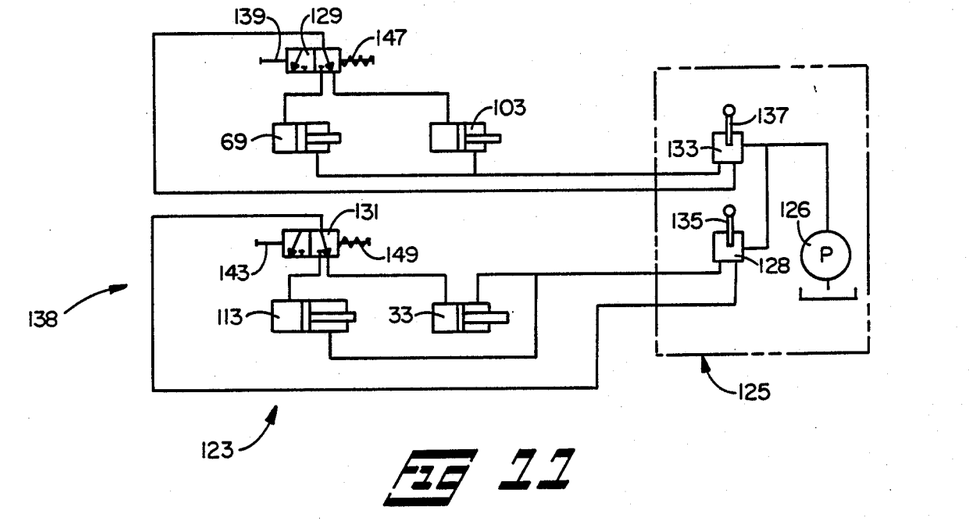
FIG. 11 is a schematic diagram of the hydraulic circuit for operating the round bale trailer of the present invention.

Now turning to FIG. 11, a schematic drawing of the hydraulic circuit 123 used for controlling the operation of the round bale trailer 1 is depicted. Reference numeral 125 represents a hydraulic power unit mounted in the tractor, as is well known in the art. The tractor hydraulic power unit 125 includes a pump 126 and a pair of directional control valves 128 and 133. Valves 128 and 133 are operated manually by respective levers 135 and 137 located on the tractor.

Mounted on the round bale trailer 1 is a hydraulic circuit portion 138 that includes two selector valves 129 and 131. A suitable selector valve is a Model 12F7 valve manufactured by HCI Prince Company. The selector valves 129 and 131 are also shown in FIGS. 1, 2, 5, 7, 8, 9, and 9a.

Selector valve 129 controls the closing arm cylinder 103 and the loading cylinder 69. Selector valve 131 controls the pusher cylinder 33 and the dump cylinder 113. Selector valve 129 is controlled by a first operating lever 139 pivotally attached to the trailer section framework 24. A suitable linkage 141 connects the lever 139 to the selector valve 129. To accommodate the pivoting of the frame 17 about axis 18, the linkage 141 includes a hinge 140. Selector valve 129 is further controlled by a finger 142 attached to the fork 13, FIGS. 1 and 2, as will be explained presently.

Selector valve 131 is controlled by a second operating lever 143 through a suitable linkage 145. Valves 129 and 131 are biased to the respective operating conditions of FIG. 11 by respective springs 147 and 149.

Operation

The operation of the round bale trailer 1 will be explained by initially assuming the round bale trailer is in the configuration of FIGS. 1 and 3. That is, the frame 17 is in the horizontal attitude, the fork 13 is open, the closing arm 101 is open, and the trailer section 5 is in the normal horizontal configuration of FIG. 10. However, initially it will be assumed that the pusher mechanism 10 is in the retracted location of FIG. 2. The initially assumed configurations are attained through the hydraulic circuits 125 and 138 in the following manner.

Lever 137 in the tractor cab is pushed to the position shown in FIG. 11. Consequently, hydraulic fluid from the pump 126 operates the closing arm cylinder 103 and the loading cylinder 69 to open the closing arm 101 and lower the frame 17 to the horizontal attitude. Operating lever 135 in the tractor cab is pushed to operate the pusher cylinder 33 to reciprocate the pusher mechanism 10 to the retracted location of FIG. 3, and the dump cylinder 113 to the raised position of FIG. 10. Because the frame 17 is in the horizontal attitude, the fork 13 is held in the open position of FIG. 1 by the spring 91 and cable 85.

The operator drives the tractor and round bale trailer 1 along the hay field in the direction of arrow 9, which is the same direction as the field is normally worked and is the direction perpendicular to the axes 151 of previously baled round bales 3. The operator steers the tractor and round bale trailer such that the fork 13 approaches and engages the bale. At approximately the same time the fork center bar 79 contacts the bale, the operator pulls the control lever 137 in the tractor cab to switch the position of the valve 133. Hydraulic fluid from the pump 126 flows through selector valve 129 to the closing arm cylinder 103 to extend the piston rod 105 and close the closing arm 101. The closing arm 101 cooperates with the fork 13 to surround the bale approximately 16 inches above the ground 25. Continued forward motion of the tractor and round bale trailer causes the weight of the bale to rotate the fork about the vertical axis 15. Simultaneously, the rotation of the fork as the round bale trailer and axis 15 progress forwardly causes the bale to turn 90 degrees, sliding on the ground, until the bale and fork reach the closed position of FIG. 2. The wide smooth plate 84 assists rotating the bale on the ground. The bale axis 151 is then parallel to the direction of round bale trailer motion 9. Roller 61 provides an anti-friction support as the fork first side bar 81 rotates onto the frame first leg support section 58. The roller 63 assists in keeping the fork nested within the frame when the fork is in the closed position.

As the fork 13 nears the closed position of FIGS. 2 and 4, the fork finger 142 contacts one end of a lever 153 pivotally connected to the frame second leg 65. The second end of the lever 153 is connected to the spool of the selector valve 129. The finger and lever 153 overcome the force of the spring 147 to immediately shift the spool of the selector valve 129 to the second position thereof, whereby hydraulic fluid flows to the loading cylinder 69 to pivot the frame, closed fork, and bale to a generally vertical attitude, FIG. 6. Thus, pivoting of the frame is accomplished immediately and automatically without intervention of the operator. As the frame and fork approach the generally vertical attitude of FIG. 6, the bale rolls off the fork and onto the trailer section beams 20 and 21 at the loading station 12. The stop 31 prevents the bale from rolling off the support beam 21 and back onto the ground.

With the bale 3 in place at the trailer section loading station 12, the operator on the tractor switches the control lever 137 to place the valve 133 back to the position of FIG. 11. Consequently, hydraulic fluid operates the loader cylinder 69 to retract the piston rod 73 and lower the frame 17 and closed fork 13 toward the horizontal attitude. As the frame and fork approach the horizontal attitude, the axis 15 approaches a vertical orientation. The spring 91 acting through the cable 85 overcomes the force of gravity on the fork and pulls the fork to the open position of FIG. 1. The shock absorber 95 slows the fork as the stop arm 93 approaches the frame second side leg 65. With the frame in the horizontal attitude and the fork open, the spring 147 forces the selector valve spool to the position of FIG. 11, thereby allowing hydraulic pressure from the tractor pump 126 to open the closing arm 101. The round bale trailer is then ready to load another bale 3 onto the trailer section. It will be appreciated that the tractor and round bale trailer did not stop moving in the forward direction at any time during the bale engagement and loading process.

As the tractor and round bale trailer 1 are driven to the next bale 3, the operator pushes the control lever 135 on the tractor. Valve 128 is actuated to permit hydraulic pressure from the pump 126 to flow through the second selector valve 131 and operate the pusher cylinder 33 and the pusher mechanism 10 to push the loaded bale at the loading station 12 toward the back end 6 of the trailer section 5. The lever 135 is returned to the configuration of FIG. 11, and the pusher cylinder operates to return the slide 37 and upright 47 to the retracted location of FIG. 2. In that manner, each loaded bale is pushed, together with any previous loaded bales, toward the back end of the trailer section. We have found that a trailer section that carries ten bales in back of the loading station works very well, but it will be appreciated that the trailer section can be dimensioned to hold more or fewer bales.

When a full load of bales 3 has been loaded onto the round bale trailer 1, it is pulled to the barnyard or other storage location. The pusher mechanism 10 is operated to push the last loaded bale past the bale stop 31. The unloading mechanism 19 is then brought into play to unload all the bales at one time. The operator merely pulls a rope 157 between the tractor cab and the second operating lever 143, FIGS. 9 and 9a. The lever 143 and linkage 145 overcome the bias of the spring 149 to shift the spool of the selector valve 131 from the position shown in FIG. 11. Consequently, hydraulic fluid flows to the dump cylinder 113 to lower the lever 117. See FIG. 10. Continued lowering of the lever 117 after the wheels 121 have contacted the ground 25 causes the entire round bale trailer to tilt about the outside tire 8a to the tipped position of FIG. 10a. We have found that tilting the round bale trailer through an angle of approximately 35 degrees to 40 degrees from the normal position of FIG. 10 is sufficient to cause the bales 3 to roll onto the ground. The long length between the tires 8 and the rotary hitch 7 enables the round bale trailer to be tilted with minimum stress on the rotary hitch. After the bales have been unloaded, the operator switches the lever 135 in the tractor to the position of FIG. 11, thereby causing the dump cylinder 113 to tilt the round bale trailer back to the normal position of FIG. 10. With the round bale trailer in the normal position, the operator releases the rope 157. The pusher mechanism 10 thus becomes operative again, and the round bale trailer is ready to return to the field for another load of bales 3.

If it is desired to operate the loading mechanism 11 to the upright configuration of FIG. 6 without a bale 3 therein, the operator pushes the control lever 137 on the tractor to close the closing arm 101. He then pulls the first operating lever 139 by means of the rope 155. The loading cylinder 69 is actuated to pivot the frame 17 to the vertical attitude. As the frame pivots, the chain 106 tightens between the trailer section 5 and the fork 13 to start to pull the fork to the closed position against the spring 91. As the frame approaches the vertical attitude, gravity causes the fork to completely close within the frame, as described previously.

Thus, it is apparent that there has been provided, in accordance with the invention, a round bale trailer that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A round bale trailer for loading, transporting, and unloading cylindrical hay bales comprising:
  a. trailer means for traveling at a constant speed toward a bale in a direction perpendicular to the bale axis and for supporting the bales;
  b. loading means mounted to the trailer means for engaging a bale having the axis thereof perpendicular to the direction of travel of the trailer means and for pivoting rearwardly about a vertical axis and then upwardly about a horizontal axis for loading the bale onto the trailer means while the trailer means continues to travel at the constant speed with the bale axis parallel to the direction of approach of the trailer means to the bale;
  c. pusher means mounted to the trailer means for pushing a bale loaded onto the trailer means along the trailer means; and
  d. unloading means mounted to the trailer means for tilting the trailer means to a tipped position wherein the bales loaded on the trailer means roll onto the ground.

2. The round bale trailer of claim 1 wherein the loading means comprises:
  a. frame means for pivoting about a first axis between a generally horizontal attitude and a generally vertical attitude; and
  b. fork means attached to the frame means for rotating about a second axis between an open and a closed position, the second axis being generally vertical when the frame means is in the horizontal attitude and generally horizontal when the frame means is in the vertical attitude, and for engaging a hay bale when the fork means is in the open position and the trailer means approaches the bale, the fork means and bale rotating together approximately 90 degrees about the second axis after the fork means has engaged the bale, and for lifting the bale off the ground when the frame means is pivoted to the vertical attitude, the fork means being in a position to allow the bale to roll off the fork means onto the trailer means when the frame means is at the vertical attitude.

3. A round bale trailer for loading, transporting, and unloading cylindrical hay bales comprising:
  a. trailer means for approaching a bale in a direction perpendicular to the bale axis and for supporting the bales;
  b. loading means mounted to the trailer means for engaging a bale having the axis thereof perpendicular to the direction of approach of the trailer means and for loading the bale onto the trailer means with the bale axis parallel to the direction of approach of the trailer means to the bale, wherein the loading means comprises:
    i. frame means for pivoting about a first axis between a generally horizontal attitude and a generally vertical attitude; and
    ii. fork means attached to the frame means for rotating about a second axis between an open and a closed position, the second axis being generally vertical when the frame means is in the horizontal attitude and generally horizontal when the frame means is in the vertical attitude, and for engaging a hay bale when the fork means is in the open position and the trailer means approaches the bale, the fork means and bale rotating together approximately 90 degrees about the second axis after the fork means has engaged the bale, and for lifting the bale off the ground when the frame means is pivoted to the vertical attitude, the fork means being in a position to allow the bale to roll off the fork means onto the trailer means when the frame means is in the vertical attitude;
  c. pusher means mounted to the trailer means for pushing a bale loaded onto the trailer means along the trailer means;
  d. unloading means mounted to the trailer means for tilting the trailer means to a tipped position wherein the bales loaded on the trailer means roll onto the ground; and
  e. closing arm means mounted to the fork means for closing adjacent the bale after the fork means has engaged the bale.

4. A round bale trailer for loading, transporting, and unloading cylindrical hay bales comprising:
   a. trailer means for approaching a bale in a direction perpendicular to the bale axis and for supporting the bales;
   b. loading means mounted to the trailer means for engaging a bale having the axis thereof perpendicular to the direction of approach of the trailer means and for loading the bale onto the trailer means with the bale axis parallel to the direction of approach of the trailer means to the bale, wherein the loading means comprises:
      i. frame means for pivoting about a first axis between a generally horizontal attitude and a generally vertical attitude, wherein the frame means comprises a generally U-shaped frame comprising a center leg and first and second side legs, means for mounting the frame center leg to the trailer means for pivoting about the first axis, and loading cylinder means connected between the trailer means and the frame for pivoting the frame between the vertical and horizontal attitudes;
      ii. fork means attached to the frame means for rotating about a second axis between an open and a closed position, the second axis being generally vertical when the frame means is in the horizontal attitude and generally horizontal when the frame means is in the vertical attitude, and for engaging a hay bale when the fork means is in the open position and the trailer means approaches the bale, the fork means and bale rotating together approximately 90 degrees about the second axis after the fork means has engaged the bale, and for lifting the bale off the ground when the frame means is pivoted to the vertical attitude, the fork means being in a position to allow the bale to roll off the fork means onto the trailer means when the frame means is at the vertical attitude;
   c. pusher means mounted to the trailer means for pushing a bale loaded onto the trailer means along the trailer means; and
   d. unloading means mounted to the trailer means for tilting the trailer means to a tipped position wherein the bales loaded on the trailer means roll onto the ground.

5. The round bale trailer of claim 4 wherein:
   a. the fork means comprises a generally U-shaped fork having a center bar and first and second side bars, the fork second side bar being rotatably joined to the frame second side leg to create the second axis; and
   b. the fork nests generally within the frame when the fork is in the closed position.

6. The round bale trailer of claim 5 further comprising plate means attached to the fork second side bar for guiding the hay bale as the bale and fork rotate about the second axis from the open position to the closed position.

7. The round bale trailer of claim 5 wherein the fork means further comprises:
   a. stop means for positively locating the fork in the open position relative to the frame; and
   b. biasing means acting between the trailer means and the fork for biasing the fork to the open position.

8. The round bale trailer of claim 5 wherein the fork means is adjustable to enable the fork means to engage bales of varying sizes.

9. The round bale trailer of claim 7 further comprising shock absorber means for cushioning the fork stop means against the frame when the fork is biased to the open position by the biasing means.

10. The round bale trailer of claim 7 wherein the biasing means comprising:
    a. a spring located inside the frame center leg; and
    b. a cable connected between the spring and the fork second side bar.

11. The round bale trailer of claim 7 further comprising means for pulling the fork toward the closed position against the force of the biasing means when the frame is pivoted to the vertical attitude.

12. The round bale trailer of claim 5 further comprising:
    a. a closing arm mounted to the fork first side bar for rotating between an open location wherein the closing arm is generally parallel to the fork first side bar and a closed location wherein the closing arm is generally perpendicular to the fork first side bar; and
    b. a closing arm cylinder mounted to the fork first side bar for rotating the closing arm.

13. The round bale trailer of claim 12 wherein the fork means first side bar comprises a tube and a bar slideably received within the tube, the closing arm being mounted to the slideable bar to thereby provide adjustability to the location of the closing arm relative to the fork means center bar,
    so that the fork means can be adjusted to engage bales of different diameters.

14. The round bale trailer of claim 12 further comprising:
    a. first selector valve means mounted to the frame for operating the loading cylinder and the closing arm cylinder; and
    b. hydraulic circuit means for controlling the first selector valve means to selectively operate the loading cylinder and the closing arm cylinder.

15. The round bale trailer of claim 4 further comprising:
    a. a first selector valve mounted to the frame for controlling the loading cylinder means;
    b. a finger on the fork means located to actuate the first selector valve when the fork means is rotated to the closed position; and
    c. control means associated with the first selector valve for operating the loading cylinder means to pivot the frame to the vertical attitude when the first selector valve is actuated by the fork means finger,
    so that the frame pivots to lift the bale and load it onto the trailer means immediately upon rotation of the fork means and the bale engaged thereby to the closed position.

16. A round bale trailer for loading, transporting, and unloading cylindrical hay bales comprising:
    a. trailer means for approaching a bale in a direction perpendicular to the bale axis and for supporting the bales, wherein the trailer means comprises:
       i. an elongated trailer section having front and back ends;
       ii. tire means for rollingly supporting the trailer section back end off the ground; and iii. rotary hitch means at the trailer section front end for removably attaching to a towing vehicle and for enabling the trailer section to be tilted to a tipped position for unloading the bales;

b. loading means mounted to the trailer means for engaging a bale having the axis thereof perpendicular to the direction of approach of the trailer means and for loading the bale onto the trailer means with the bale axis parallel to the direction of approach of the trailer means to the bale;

c. pusher means mounted to the trailer means for pushing a bale loaded onto the trailer means along the trailer means; and d. unloading means mounted to the trailer means for tilting the trailer means to a tipped position wherein the bales loaded on the trailer means roll onto the ground, wherein the unloading means comprises:

i. a lever having a first end joined to the trailer section and a second end, the lever being pivotable between a raised position wherein the lever second end is adjacent the trailer section and a lowered position wherein the lever second end contacts the ground; and ii. a dump cylinder mounted between the lever and the trailer section for pivoting the lever between the raised and lowered positions, so that continued operation of the dump cylinder to pivot the lever second end against the ground causes the round bale trailer to tilt about the tire means to a tipped position to cause the bales loaded on the trailer section to roll onto the ground.

17. Apparatus for handling cylindrical objects lying on a surface comprising:

a. trailer means for traveling at a constant speed along the surface and for supporting objects loaded at a loading station thereon;

b. loading means mounted to the trailer means for traveling therewith to engage an object with the object axis being perpendicular to the direction of trailer means travel and for rearwardly rotating the object on the surface approximately 90 degrees about a vertical axis and for loading the object onto the trailer means by rotating the object about a horizontal axis at the loading station thereof while the trailer means continues to travel at the constant speed;

c. pusher means mounted to the trailer means for pushing objects away from the trailer means loading station;

d. unloading means mounted to the trailer means for simultaneously unloading all the objects loaded onto the trailer means; and e. means for controlling the operation of the loading means, pusher means, and unloading means.

18. Apparatus for handling cylindrical objects lying on a surface comprising:

a. trailer means for traveling along the surface and for supporting objects loaded at a loading station thereon;

b. loading means mounted to the trailer means for traveling therewith to engage an object with the object axis being perpendicular to the direction of trailer means travel and for rotating the object on the surface approximately 90 degrees and for loading the object onto the trailer means at the loading station thereof, wherein the loading means comprises:

i. generally U-shaped frame mounted to the trailer means for pivoting about a first axis in a plane generally aligned with the trailer means loading station between a generally horizontal attitude and a generally vertical attitude;

ii. a generally U-shaped fork mounted to the frame for rotating about a second axis that is generally perpendicular to the first axis between an open position in which the fork is engagable with the object with the object axis being perpendicular to the direction of trailer means travel and a closed position wherein the fork is generally nested within the frame and the axis of the object engaged in the fork is parallel to the direction of trailer means travel; and iii. loading cylinder means mounted between the frame and the trailer means for pivoting the frame between the horizontal and vertical attitudes to lift the fork and the object from the surface and load it onto the trailer means at the loading station thereof;

c. pusher means mounted to the trailer means for pushing objects away from the trailer means loading station;

d. unloading means mounted to the trailer means for simultaneously unloading all the objects loaded onto the trailer means; and e. means for controlling the operation of the loading means, pusher means, and unloading means.

19. The apparatus of claim 18 wherein:

a. the frame has a center leg pivotally mounted to the trailer means and first and second side legs extending from opposite ends of the center leg;

b. the fork has a center bar and first and second side bars extending from opposite ends of the center bar; and c. the frame second side leg and the fork second side bar are rotatably joined to each other to create the second axis, so that the second axis swings in a plane between generally vertical and horizontal orientations as the frame pivots between the horizontal and vertical attitudes, respectively.

20. The apparatus of claim 19 further comprising biasing means connected between the fork and the trailer means for biasing the fork to the open position.

21. The apparatus of claim 20 further comprising chain means for pulling the fork to the closed position thereof within the frame against the force of the biasing means as the frame is pivoted from the horizontal attitude to the vertical attitude without an object engaged by the fork, so that the fork automatically rotates to the closed position about the second axis when the frame is pivoted from the horizontal attitude to the vertical attitude without an object engaged by the fork.

22. The apparatus of claim 19 further comprising:

a. stop means acting between the fork and the frame for locating the fork in the open position;

b. a spring having first and second ends the first end being connected to the trailer means; and c. a cable having first and second ends, the first end being connected to the spring second end and the cable second end being connected to the fork second bar, so that the spring and cable bias the fork to the open position.

23. The apparatus of claim 19 further comprising:
   a. a closing arm pivotally mounted to the fork first side bar; and
   b. a closing cylinder mounted between the fork first side bar and the closing arm for pivoting the closing arm between an open location whereat the closing arm is generally parallel to the fork first side bar and a closed location whereat the closing arm is generally perpendicular to the fork first side bar,
   so that the closing arm cooperates with the fork to selectively enclose the object engaged by the fork.

24. The apparatus of claim 23 wherein the fork first side bar comprises a tube and a bar slideably received within the tube, the closing arm and closing cylinder being mounted to the free end of the slideable bar to provide adjustment of the closing arm relative to the fork center bar,
   so that the fork can handle objects of different sizes.

25. The apparatus of claim 19 wherein at least the fork center bar of the first side bar is adjustable to enable the fork to handle different size objects.

26. The apparatus of claim 18 wherein the loading means further comprises closing means mounted to the fork for cooperating therewith to selectively enclose the object engaged by the fork.

27. The apparatus of claim 18 wherein the control means for operating the loader means comprises:
   a. a first selector valve mounted to the frame for operating the loading cylinder; and
   b. finger means mounted to the fork for actuating the first selector valve when the fork is in the closed position to operate the loading cylinder to pivot the frame to the vertical attitude,
   so that immediately upon the fork rotating about the second axis to the closed position with an object engaged thereby the loading cylinder is operated to load the object onto the trailer means at the loading station thereof.

28. The apparatus of claim 27 further comprising:
   a. a second selector valve mounted to the trailer means for selectively operating the pusher means and the unloading means;
   b. first operating means mounted to the trailer means for actuating the first selector valve; and
   c. second operating means mounted to the trailer means for actuating the second selector valve.

29. The apparatus of claim 28 wherein the first operating means comprises:
   a. a first operating lever pivotally joined to the trailer means; and
   b. a linkage connecting the first operating lever to the first selector valve, the linkage including hinge means for permitting the linkage to accommodate the pivoting of the frame on the trailer means.

30. Apparatus for handling cylindrical objects lying on a surface comprising:
   a. trailer means for traveling along the surface and for supporting objects loaded at a loading station thereon, the trailer means comprising:
      i. an elongated trailer section having a back end and a front end, the loading station being located near the trailer section front end; and
      ii. a rotary hitch mounted to the trailer section front end;
   b. loading means mounted to the trailer means for traveling therewith to engage an object with the object axis being perpendicular to the direction of trailer means travel and for rotating the object on the surface approximately 90 degrees and for loading the object onto the trailer means at the loading station thereof;
   c. pusher means mounted to the trailer means for pushing objects away from the trailer means loading station;
   d. unloading means mounted to the trailer means for simultaneously unloading all the objects loaded onto the trailer means, wherein the unloading means comprises:
      i. a lever having a first end rotatably mounted to the trailer section; and
      ii. a dump cylinder mounted between the lever and the trailer section for rotating the lever between a raised position whereat the lever second end is above the surface and a lowered position whereat the lever second end is in contact with the surface, the lever and dump cylinder cooperating under continued rotation of the lever by the dump cylinder to tilt the trailer section to a tipped position and thereby cause the objects supported on the trailer section to roll off onto the surface; and
   e. means for controlling the operation of the loading means, pusher means, and unloading means.

31. A method of handling cylindrical hay bales comprising the steps of:
   a. providing an elongated trailer having a loading station;
   b. providing a loading mechanism mounted to the trailer for loading the bales onto the trailer at the loading station thereof;
   c. pulling the trailer in a forward motion in a hay field in a direction perpendicular to the axes of the bales;
   d. engaging a bale with the loading mechanism;
   e. rotating the bale on the ground approximately 90 degrees by continued forward motion of the trailer while the bale remains on the ground during rotation so that the bale axis is generally parallel to the direction of trailer travel;
   f. loading the bale transversely onto the trailer at the loading system thereof with the bale axis being parallel to the direction of trailer travel.

32. The method of claim 31 wherein the step of providing a loading mechanism mounted to the trailer comprises the steps of:
   a. providing a frame mounted to the trailer for pivoting about a first axis between a generally horizontal attitude and a generally vertical attitude; and
   b. providing a fork mounted to the frame for rotating about a second axis between an open position and a closed position, the fork being generally nested within the frame when the fork is in the closed position.

33. The method of claim 32 wherein the step of engaging a bale with the loading mechanism comprises the steps of:
   a. rotating the fork to the open position; and
   b. engaging the bale with the fork.

34. The method of claim 33 wherein the step of rotating the bale on the ground 90 degrees comprises the steps of:
   a. continuously pulling the trailer after the fork has engaged the bale; and b. rotating the fork and bale together to the fork closed position.

35. The method of claim 34 wherein the step of loading the bale onto the trailer comprises the step of pivoting the frame together with the fork nested therein and the bale engaged within the fork to the vertical attitude until the bale rolls off the fork and onto the trailer.

36. The method of claim 35 comprising the further step of pivoting the frame from the vertical attitude to the horizontal attitude and simultaneously rotating the fork about the second axis from the closed position to the open position.

37. The method of claim 33 wherein the step of engaging a bale with the loading mechanism further comprises the steps of:
   a. providing a closing arm on the fork;
   b. opening the closing arm prior to engaging the bale with the fork; and
   c. closing the closing arm to engage the bale when the fork engages the bale.

38. The method of claim 37 wherein the step of engaging a bale with the loading mechanism further comprises the step of adjusting the location of the closing arm on the fork to thereby enable the fork to engage bales of different diameters.

* * * * *